United States Patent [19]

Hellmer et al.

[11] Patent Number: 4,605,368
[45] Date of Patent: Aug. 12, 1986

[54] SWIVEL HOSE CONNECTION AND ADJUSTABLE MOUNTING OF SUPPORT MEMBER FOR CAM FOLLOWER AND SWIVELS

[75] Inventors: Ernest W. Hellmer; Frank W. Pfohl, both of Chicago, Ill.

[73] Assignee: Continental Plastic Containers, Stamford, Conn.

[21] Appl. No.: 749,214

[22] Filed: Jun. 27, 1985

[51] Int. Cl.$^4$ .............................................. B29C 49/56
[52] U.S. Cl. ..................... 425/195; 425/540; 425/541; 425/182; 425/576
[58] Field of Search .............. 425/540, 541, 539, 576, 425/195, 182, 192 R, 193

[56] References Cited

U.S. PATENT DOCUMENTS

| | | | |
|---|---|---|---|
| 2,359,216 | 9/1944 | Hofmann et al. | 425/540 |
| 3,025,561 | 3/1962 | Ruekberg et al. | 425/540 |
| 3,146,491 | 9/1964 | Eyquem | 425/540 |
| 3,310,834 | 3/1967 | Simpson et al. | 425/182 |
| 3,785,761 | 1/1974 | Logomasini et al. | 425/540 |
| 4,523,904 | 6/1985 | Martin | 425/540 |

Primary Examiner—Tim Miles
Attorney, Agent, or Firm—Charles E. Brown

[57] ABSTRACT

This relates to a blow molding apparatus of the rotary wheel type and particularly relates to supplying fluids, such as air, vacuum and water to a mold half and its associated carrier in a manner which permits the reciprocation of the mold half and associated carrier between a mold open position and a mold closed position. This is facilitated by the use of short lengths of hose which are attached to respective manifolds by swivels. The swivels permit the ends of the hose to change their angular relationship as one end of each hose moves relative to an opposite end of the hose. Adjacent ones of the hoses are located in adjacent parallel planes and are initially bowed in one direction and reverse their direction of bow as movable ends of the hoses move beyond fixed ends of the hoses. The carrier for the movable mold half has associated therewith a cam follower for engaging a cam which effects the opening and closing of the mold. The mold carrier is adjustable relative to the axis of rotation of the apparatus so as to accommodate molds of different sizes. The cam follower is specially mounted for adjustment relative to the mold carrier. Further, the manifolds for the moving terminal ends of the hoses are carried by the support for the cam follower so that the movement of the hoses is the same for all positions of the carrier.

14 Claims, 6 Drawing Figures

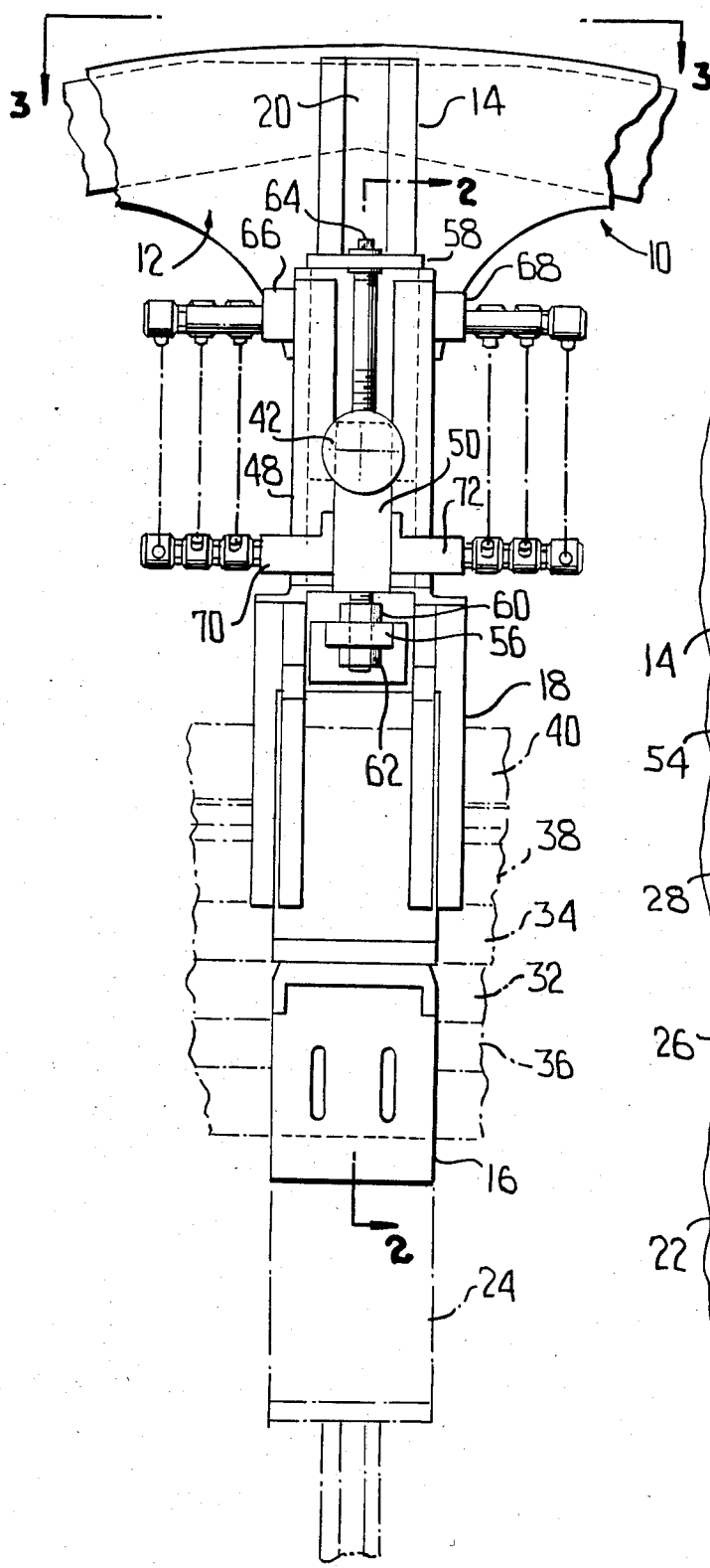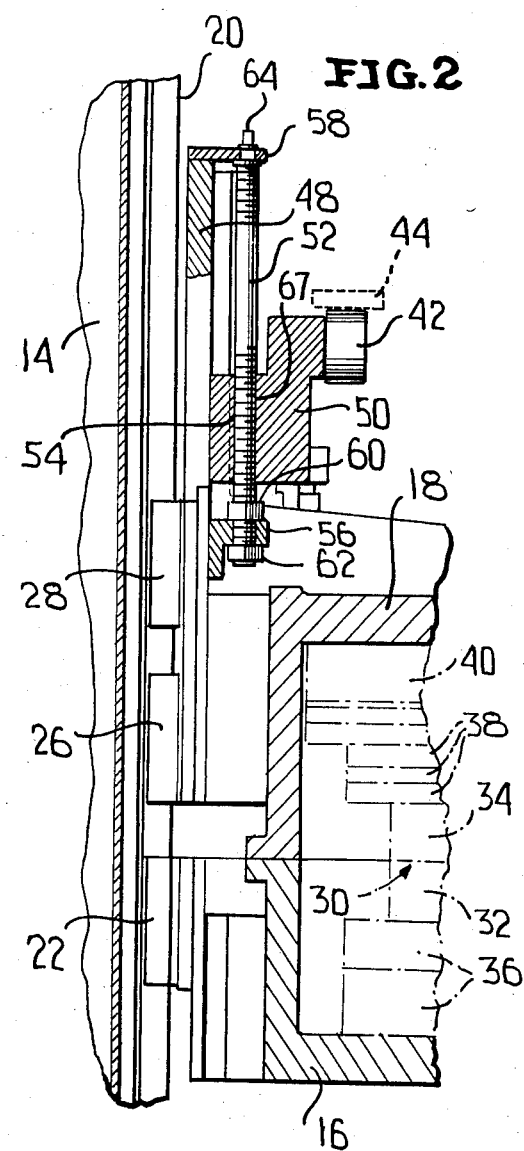

SWIVEL HOSE CONNECTION AND ADJUSTABLE MOUNTING OF SUPPORT MEMBER FOR CAM FOLLOWER AND SWIVELS

This invention relates in general to new and useful improvements in blow molding apparatus of the rotary wheel type wherein a supporting frame generally in the form of a wheel is mounted for rotation about an axis, normally a horizontal axis. The frame is provided with a plurality of spokes and mounted on each spoke is a split mold assembly including an inner mold half and an outer mold half. The mold halves are carried by carriers and there are provided means for radially adjustably, but fixedly mounting an inner mold half carrier while an outer mold half carrier is mounted on a track for radial reciprocating movement between a mold open position and a mold closed position. It is necessary that fluid lines be connected to the outer mold half notwithstanding the radial reciprocating movement of the outer mold half.

This invention relates to two specific features which are related to one another.

First of all, the fluid lines have terminals which are fixed to the frame of the blow molding apparatus and other terminals which are movable together with the outer mold half carrier. Because of the constant relative movement of the terminals with respect to one another, it is customary to use elongated hoses having their ends angularly fixed with respect to the terminals. This requires hoses of considerably more length than the extreme distances between the terminals. Such extra length hoses have caused problems in the past. First of all, the rotating frame or wheel is mounted in a support and in order to hold the height of the apparatus to a minimum, there is relatively close clearances between the rotating wheel and base frame members of the supporting frame. When the hoses are of extra length, this has caused a problem.

Also, because of the extra length of the hoses which permits the relative movement of the terminal ends of the hoses, the hoses have a tendency to rub against one another and undue wear occurs.

It has been found in accordance with this invention that if in lieu of the ends of the hoses being angularly fixed, swivels are utilized to mount the ends of the hoses, the hoses may be relatively short and may generally lie in adjacent parallel planes without touching each other or protruding so as to engage any part of the supporting frame for the rotating wheel. Most particularly, the hoses are slightly bowed in each of the two extreme positions of the outer mold half carrier and as the outer mold half carrier goes between a mold open position and a mold closed position, each hose will pass an over-center position wherein the bow direction will change.

Another problem is the fact that a blow molding apparatus of the type in question is constructed so that it may receive molds of different sizes. As a result, when the radial positions of the mold half carriers are adjusted, the spacing of the outer mold half carrier with respect to fluid supplies changes. Also, the relationship between the cam follower, which effects opening and closing of the molds and the outer mold half carrier must change. In accordance with this invention, a support member for the cam follower is mounted for adjustment relative to a supporting carrier for the outer mold half carrier. Thus the relationship of the cam follower with respect to its cam may remain constant while the relationship of the cam follower relative to the outer mold half carrier may be adjusted to compensate for different radial positions of the outer mold half carrier.

Further, the inner terminals of the fluid supply lines may be mounted on the support member so that the relationship of the movable terminals for the fluid supply lines relative to the fixed terminals for the fluid supply lines may remain constant.

With the above and other objects in view that will hereinafter appear, the nature of the invention will be more clearly understood by reference to the following detailed description, the appended claims, and the several views illustrated in the accompanying drawings.

FIG. 1 is a fragmentary elevational view showing generally the mounting details for a single mold of a blow molding apparatus formed in accordance with the invention.

FIG. 2 is a fragmentary vertical sectional view taken generally along the line 2—2 of FIG. 1 and shows more specifically the adjustable mounting of the support member for the cam follower relative to the supporting carrier.

Figure 3:
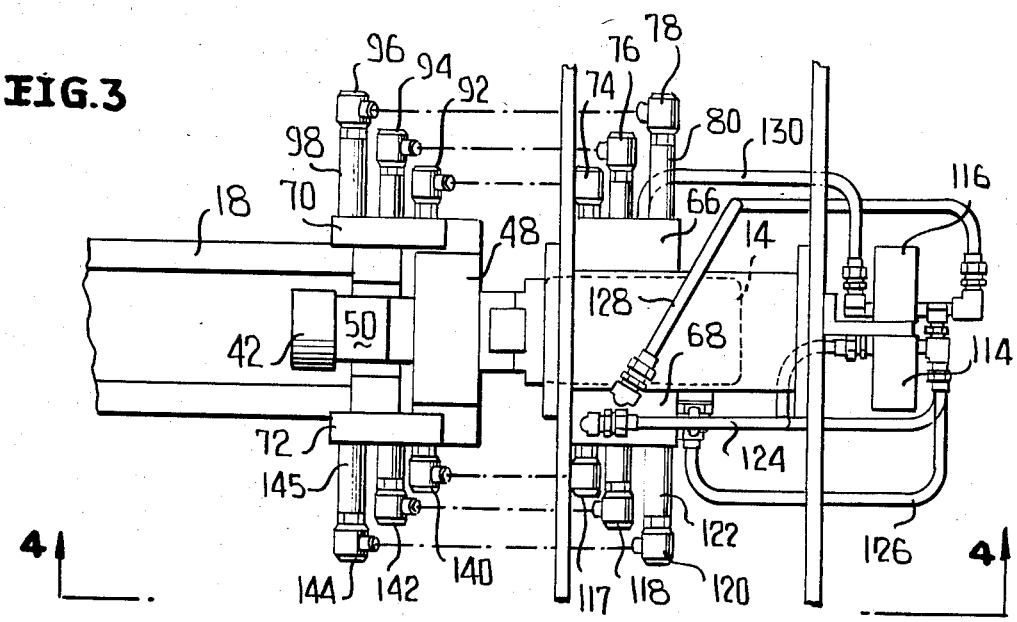
FIG. 3 is generally a plan view showing the details of the mounting of the mold of FIGS. 1 and 2 together with the various fluid lines associated therewith.

Referring now to the drawings in detail, it will be seen that there is illustrated in FIGS. 1 and 2 the mounting of a single split mold of a multiple station blow molding apparatus of the rotating wheel type. It is to be understood that the apparatus includes a rotation wheel 10 mounted for rotation about a horizontal axis (not shown). The wheel 10 includes a frame generally identified by the numeral 12. The frame 12 includes, among other features, a plurality of radiating spokes 14. Each mold is mounted on one of the spokes 14.

In order that molds of different sizes may be accommodated, each station includes an inner mold half carrier 16 and an outer mold half carrier 18. The carriers 16, 18 are mounted for radial movement on a track 20 which is supported on and runs lengthwise of the associated spoke 14.

In the operation of the blow molding apparatus 10, the inner mold half carrier 16 is fixed while the outer mold half carrier 18 is reciprocated radially along the track 20 to effect opening and closing of the mold.

The inner mold half carrier 16 is mounted on the track 20 by way of a bearing assembly 22 for adjustment radially of the wheel 10. However, it is supported in its fixed position by means of a replaceable spacer 24 which is best shown in FIG. 1. On the other hand, it will be seen that the outer mold half carrier 18 is mounted for freedom of movement along the track 20 by a pair of bearing assemblies 26, 28.

A typical mold, generally identified by the numeral 30, is shown in phantom lines in FIG. 2 mounted within the carriers 16, 18. The mold 30 includes an inner mold half 32 and an outer mold half 34. The inner mold half 32 is mounted on replaceable spacers 36 while the outer mold half 34 is mounted within the carrier 18 by replaceable spacers 38. The outer mold half carrier 18 is also provided with a pressure pack 40 which permits the carriers 16, 18 to be locked together in a mold closed position under no pressure, after which the pressure pack 40 is energized so as to expand radially and clamp the mold halves 32, 34 together.

It is to be understood that the carriers 16, 18 in the position illustrated in FIGS. 1 and 2, may accommodate mold halves of different sizes. However, the spacers 36, 38 will accommodate only a limited range of molds. When the molds differ in sizes, the carrier 16 will be moved radially inwardly and a shorter spacer would be substituted for the spacer 24. The net result is that the mold closed position of the carrier 18 would have to be radially adjusted. This can be automatically effected in the manner to be described hereinafter.

It is to be understood that the mold half carriers 16, 18 will be clamped together by way of a cam follower 42 which along a portion of a travel of the mold unit will be engaged with a mold closing cam 44 which is illustrated in phantom lines in that it is positioned remote from the position of the single station of FIGS. 1 and 2. In view of the fact that the radial position of the carrier 18 will vary depending upon the adjustment of the mold unit, and since the cam follower 42 must maintain a constant relationship with respect to the cam 44, as well as a mold opening cam 46 shown in FIG. 6, it is necessary that the cam follower 42 be adjusted relative to the carrier 18. This is accomplished by mounting the carrier on a supporting carrier 48 to which the bearing units 26, 28 are mounted. The supporting carrier 48, in turn, carries a support member 50 for radial adjustment and the support member 50 carries the cam follower 42. The supporting carrier 48 has a guideway 52 in which a portion of the support member 50 is positioned for guided radial movement.

The position of the support member 50 and thus the cam follower 42 is adjusted relative to the supporting carrier 48 and the outer mold half carrier 18 by means of a feed screw or positioning screw 54. The screw 54 has one end portion journalled in a bracket 56 fixed relative to the supporting carrier 48. The opposite end portion of the screw 54 is journalled in a plate or bracket 58 also carried by the supporting carrier 48 but remote from the bracket 56.

As a matter of convenience, the screw 54 has welded thereto at one side of the bracket 56 a first nut 60. A second nut 62 is not welded to the threaded shaft 54 but is merely threaded thereonto and is disposed on the opposite side of the bracket 56 from the nut 60.

The opposite end of the feed screw or threaded shaft 54 is of a square cross section as at 64 to receive a suitable ridge. When it is desired to adjust the position of the cam 42, the nut 62 is loosened, and then the feed screw 54 is rotated. Because the feed screw 54 passes through the support member 50 in a threaded bore 67, rotation of the feed screw 54 results in movement of the support member 50.

It is to be understood that in the normal operation of the mold 30, various fluids are to be supplied thereto and returned therefrom. First of all, the outer mold half 34 must have its temperature regulated and, therefore, there must be a fluid line for water going into the mold half and returning from the mold half. Next, a vacuum is required. Air is required for the pressure pack 40. Air is also required for the blowing operation. Finally, because the blow operation is effected through a conventional needle (not shown), air is required to effect the positioning of the blow needle.

In order to effect the flow of these fluids to the outer mold half 34, provisions are provided for six separate fluid lines extending from fixed manifolds carried by the frame to movable manifolds carried by the support member 50. As is generally shown in FIG. 1, there is mounted on opposite sides of the spoke 40 manifold members 66, 68. Like manifold members 70, 72 are mounted on opposite sides of the support member 50. Each of the manifold members 66, 68, 70 and 72 is provided with three separate fluid passages therethrough.

Each of the manifolds 66, 68, 70 and 72 carry separate swivel fittings.

The manifold 66 has carried thereby swivel fittings 74, 76, 78 which are mounted on stand-off members 80 of different lengths. Thus the swivel fitting 74 is disposed closely adjacent the manifold 66 while the swivel fitting 78 is spaced considerably therefrom, as is clearly shown in FIG. 3.

Figure 6:
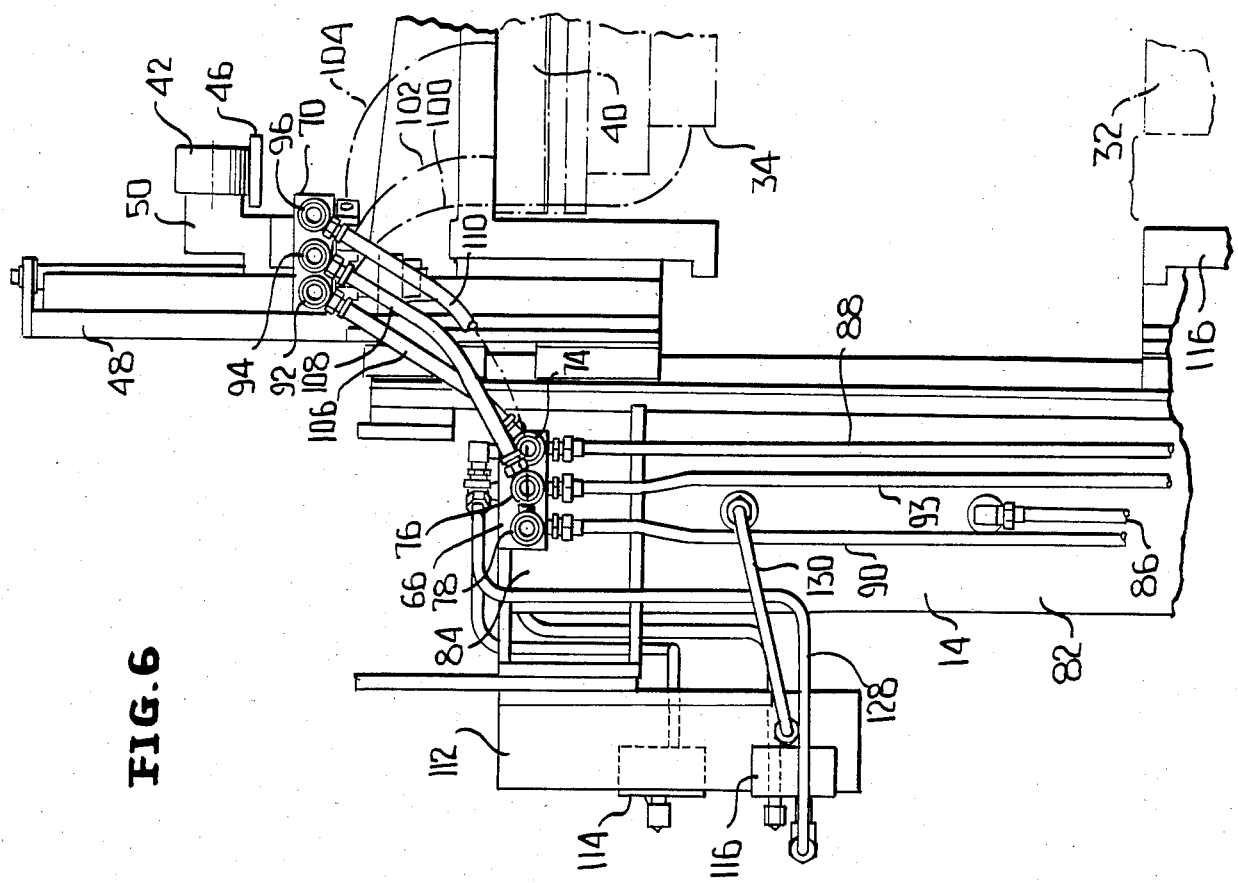
FIG. 6 is an elevational view taken generally along the line 6—6 of FIG. 5 showing the mold in its open position and being opposite from the open position shown in FIG. 4.

With reference to FIG. 6, it is to be understood that the spoke 14 is hollow and the lower portion thereof forms a storage for a supply of compressed air under pressure, the storage area being identified by the numeral 82. A radially outer portion of the spoke 14 forms a separate compressed air storage area generally identified by the numeral 84. Blow air is directed into the storage area 82 through a pipe 86.

A fuid line 88, which is coupled to a vacuum source, is coupled to the manifold 66 in communication with the swivel 74. A fluid line 90 is coupled to the manifold 66 in communication with the swivel 78 for supplying water to the outer blow mold half 34. A water return line 93 is coupled to the manifold 66 in communication with the swivel 76.

The manifold 70, as is best shown in FIG. 3, carries swivels 92, 94, 96 by way of stand-offs 98 of different lengths so as to lie in common planes with the swivels 74, 76, 78 respectively.

As is best shown in FIG. 6, suitable fluid lines 100, 102, 104 extend from manifold 70 in communication with the swivels 92, 94, 96, respectively and suitably connected to the outer mold half 34.

At this time it is pointed out that the swivel 92 is connected to the swivel 74 by a length of hose 106. A similar, but different length of hose 108 extends between the swivels 76 and 94. A further and still longer length of hose 110 extends between the swivels 74 and 96. It is to be noted that the hoses 106, 108, 110 are slightly bowed and, as is clearly shown in FIG. 5 lie in adjacent parallel planes.

A suitable support member 112 is carried by the radially outer part of the spoke 14 and supports control valves 114, 116.

At this time it is pointed out that the manifold 68 carries swivels 117, 118 and 120 by way of stand-offs 122 of different lengths. The manifold 68 has a fluid passage therethrough coupled to the swivel 117 and in communication with the fluid passage there is a fluid line 124 which carries air for actuating the pressure pack 40. The line 124 is coupled to the valve 114 which receives air from the storage area 84 through a fluid line 126.

A fluid line 128 is coupled to the manifold 68 in communication with the swivel 118 for supplying blow air. The fluid line 128 is coupled to the control valve 116 which receives air from the storage area 82 through a fluid line 130 which is coupled to the storage area 82.

There is also coupled to the manifold 68 in communication with the swivel 118 a blow air return line 132 which is disposed adjacent a compressed air supply line 134 for the storage area 84.

Air for controlling the actuation of the blow needle is supplied from the valve 116 to the manifold 68 in communication with the swivel 120 through an air line 136. A discharge line for the needle retract air is identified by the numeral 138 and is also coupled to the manifold 68 in communication with the swivel 120.

Figure 5:
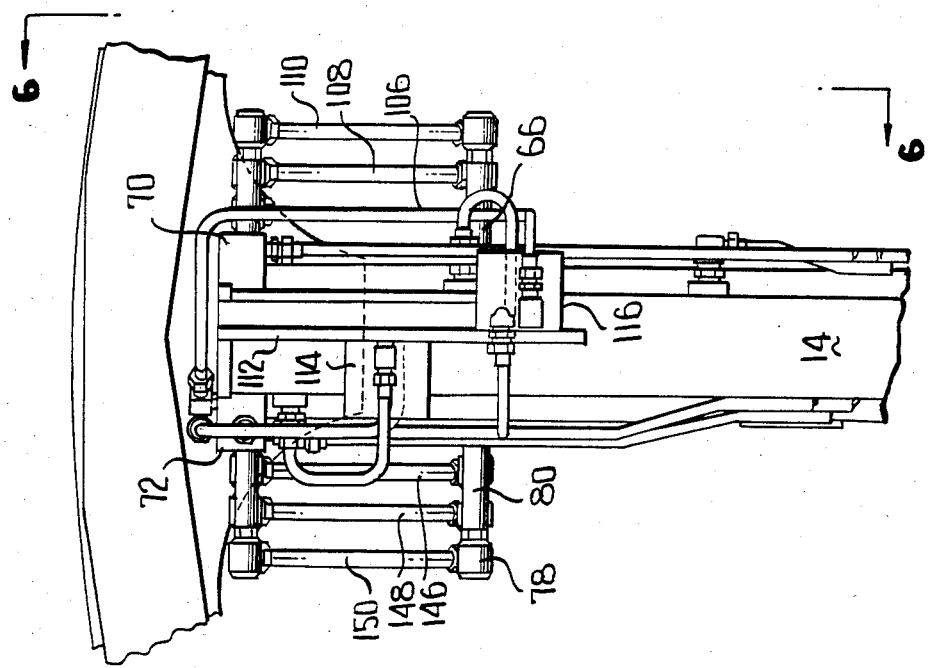
FIG. 5 is a fragmentary elevational view similar to the upper part of FIG. 1 and showing the opposite side of the apparatus, the view being taken generally along the line 5—5 of FIG. 4.

The manifold 72 carries swivels 140, 142, 144 on stand-offs 145 of different lengths and lie in alignment with the swivels 117, 118, 120. As is best shown in FIGS. 3 and 5, a hose 146 extends between the swivels 117, 140, a hose 148 extends between the swivels 118, 142 and a hose 150 extends between the swivels 120, 144. These hoses are of different lengths and lie in adjacent parallel planes. Further, the hoses 146, 148, 150 bow in the same manner as the previously described hoses 106, 108, 110.

Figure 4:
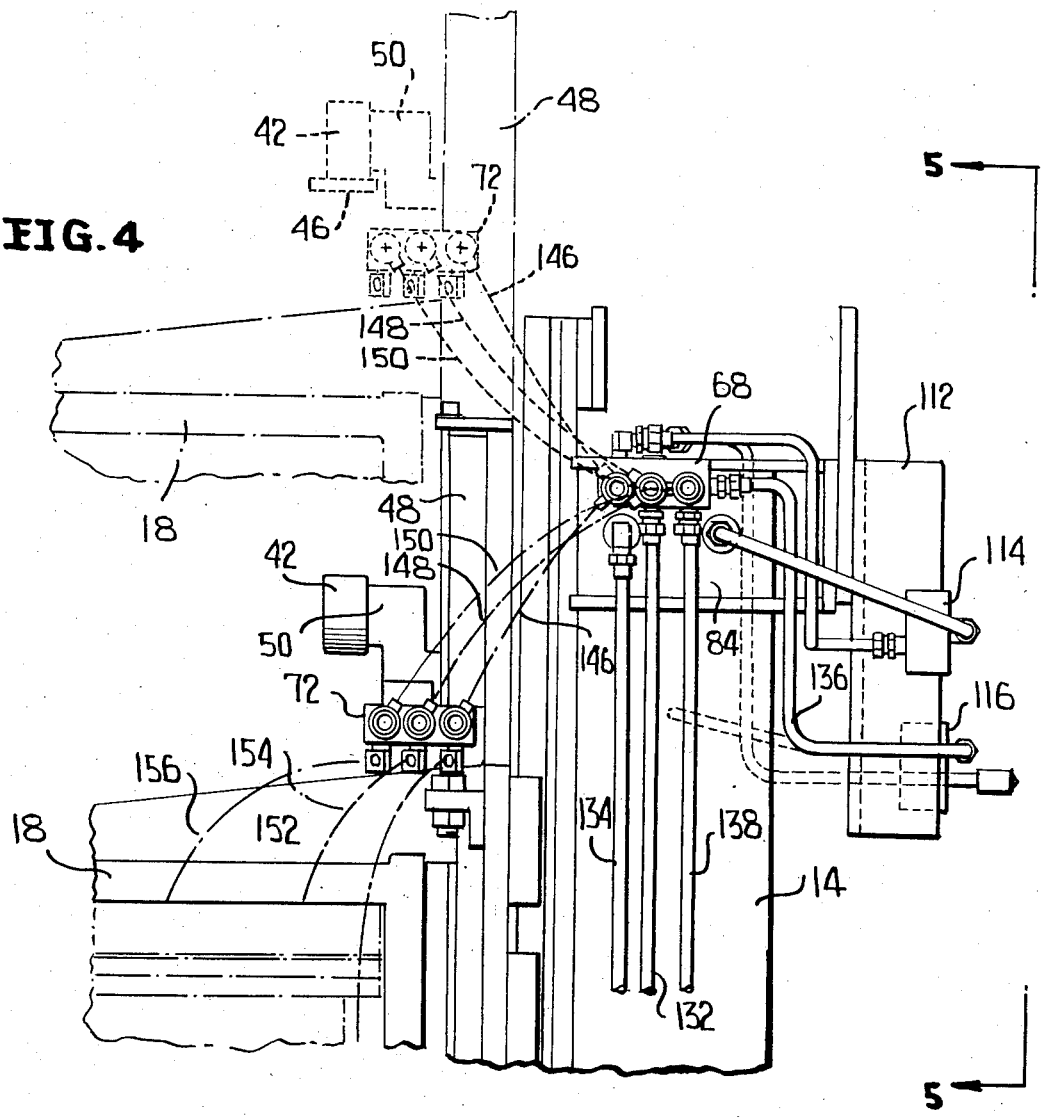
FIG. 4 is a fragmentary vertical sectional view taken generally along the line 4—4 of FIG. 3 and shows more specifically the relationship of the various fluid lines including the hose and swivel arrangements which permit movement of the outer mold half carrier from a mold closed position to a mold open position, the mold open position being shown in phantom lines.

As is schematically shown in FIG. 4, the manifold 72 has extending therefrom fluid lines 152, 156 which are in communication with the swivels 140, 142, 144, respectively, and which are coupled to the pressure pack and the outer blow mold half 34.

It is to be understood that the hoses 106, 108, 110, 146, 148, 150 have a desired degree of flexibility while being sufficiently rigid to prevent collapse. Thus as the mold opens and closes, the hoses are capable of flexing while the swivels are capable of pivoting about their respective axes.

As is best shown in FIG. 4, the manifold 68, as well as the manifold 66, is positioned midway of the movement of the manifold 72 on the one hand and the manifold 70 on the other hand. Further, as is clearly shown in FIG. 4, the various hoses all bow generally radially outwardly when the mold is in its closed state. However, when the mold is moved to its open position, at some point the hoses reach an over center position wherein they move from a radially outwardly bowed condition to a radially inwardly bowed condition as is shown in phantom lines in FIG. 4. However, the hoses at all times remain in their respective planes and do not come into contact with one another.

Although it has not been specifically illustrated here, it is to be understood that the supporting frame of the blow molding apparatus will have lower cross members which are only closely cleared by the rotating wheel 10. By utilizing the swivels, which permits the change in the angular relationship of the ends of the hoses relative to the respective manifolds, the hoses may be relatively short and do not project radially outwardly beyond the manifolds 66, 68 in the closed position of the molds as is the case when the molds pass along a bottom part of the supporting frame. Therefore, not only may the wheel 10 be positioned closely adjacent the supporting frame for the wheel without worry of the hoses striking any part of the supporting frame, but also since the hoses do not contact one another, wear by rubbing is prevented.

While specific fluid lines have been described, it is to be understood that the fluid lines may be varied depending upon the operating conditions of the mold.

It is to be particularly noted that by maintaining the positions of the manifolds 70, 72 relative to the manifolds 66, 68, even when the mold carrier 18 is adjusted radially, the short fixed lengths of hoses accommodate all conditions of adjustment.

Although only a preferred embodiment of the blow molding apparatus has been specifically illustrated and described herein, it is to be understood that minor variations may be made therein without departing from the spirit and scope of the invention as defined by the appended claims.

We claim:

1. A fluid supply system for a blow molding apparatus of the rotary wheel type, said blow molding apparatus having a radially opening split mold assembly wherein a radially inner mold half carrier is radially fixed, and a radially outer mold half carrier is radially movable, a frame, means mounting said mold half carriers on said frame, a fluild line having a terminal mounted in a fixed position on said frame, said outer mold half carrier having a like fluid line terminal mounted thereon for radial movement therewith relative to said radially fixed terminal, a flexible fluid line connecting said fixed and radially movable terminals, said flexible fluid line including a swivel fitting at each of said terminals and a hose extending between said swivel fittings, said hose being of a length to be bowed in both radial extreme positions of said radially movable terminal with the bow being different at said radial extreme positions with said swivels permitting the change in said bow.

2. A fluid supply system according to claim 1 wherein the position of said radially fixed terminal is intermediate the radial extreme positions of said radially movable terminal with the bow of said hose being in different directions at said radial extreme positions.

3. A fluid supply system according to claim 2 wherein said bow in each direction is a minimum at both of said radial extreme positions.

4. A fluid supply system according to claim 1 wherein there are a plurality of said fixed terminals and a like plurality of said radially movable terminals, and there is one of said flexible fluid line extending between each respective pair of said terminals, said flexible fluid lines lying in separate spaced parallel planes.

5. A fluid supply system according to claim 4 wherein said flexible fluid lines when viewed normal to said planes are disposed in crossing relation.

6. A fluid supply system according to claim 4 wherein said flexible fluid lines when viewed normal to said planes are disposed in crossing relation and are of different lengths.

7. A fluid supply system according to claim 4 wherein said flexible fluid lines when viewed normal to said planes are disposed in crossing relation, are of different lengths, and have different degrees of bow.

8. A fluid supply system according to claim 4 wherein said flexible fluid lines when viewed normal to said planes are disposed in crossing relation, and have different degrees of bow.

9. A fluid supply system according to claim 1 wherein said outer mold half carrier has attached thereto a support member which carries a cam follower for cooperation with cam means to open and close an associated mold, said radially movable terminal being carried by said support member whereby the movement of said radially movable terminal is the same for all operating conditions of said blow molding apparatus.

10. A fluid supply system according to claim 9 wherein said mold half carriers are adjustable radially on said frame, and there are means for adjusting the radial position of said support member relative to said outer mold half carrier whereby said radial extreme positions of said radially movable terminal relative to said radially fixed terminal remains constant.

11. A fluid supply system according to claim 10 wherein said outer mold half carrier and said support member are carried by a supporting carrier, said frame has a radially extending track, and bearing means carried by said supporting carrier mount said supporting carrier for free movement along said track under control of said cam follower.

12. In a blow molding apparatus of the rotary wheel type, a frame, a radially extending track carried by said frame, means radially adjustably fixedly mounting an inner mold half carrier on said track, a supporting carrier, bearing means mounting said supporting carrier on said track for radial movement, an outer mold half carrier mounted on said supporting carrier, a support member radially adjustably mounted on said supporting carrier for adjustable positioning relative to said outer mold half carrier, a cam, and a cam follower carried by said support member and being engageable with said cam to move said supporting carrier between mold open and mold closed positions.

13. In a blow molding apparatus according to claim 12, wherein said support member is mounted on said support carrier for guided movement, and there is a feed screw between said supporting carrier and said support member for effecting said adjustable positioning of said support member and thus said cam follower whereby said cam follower is maintained in constant relation to said cam notwithstanding radial adjustments of operating positions of said mold carriers.

14. In a blow molding apparatus according to claim 12, wherein said means radially adjustably mounting said inner mold half carrier include bearing means mounting said inner mold half carrier for radial movement on said track, and replaceable radially inner support means fixed to said frame and said inner mold half carrier.

* * * * *